Nov. 2, 1937.   J. PFAFFENBERGER   2,098,064
MAGNETIC TESTING DEVICE
Filed Aug. 27, 1934
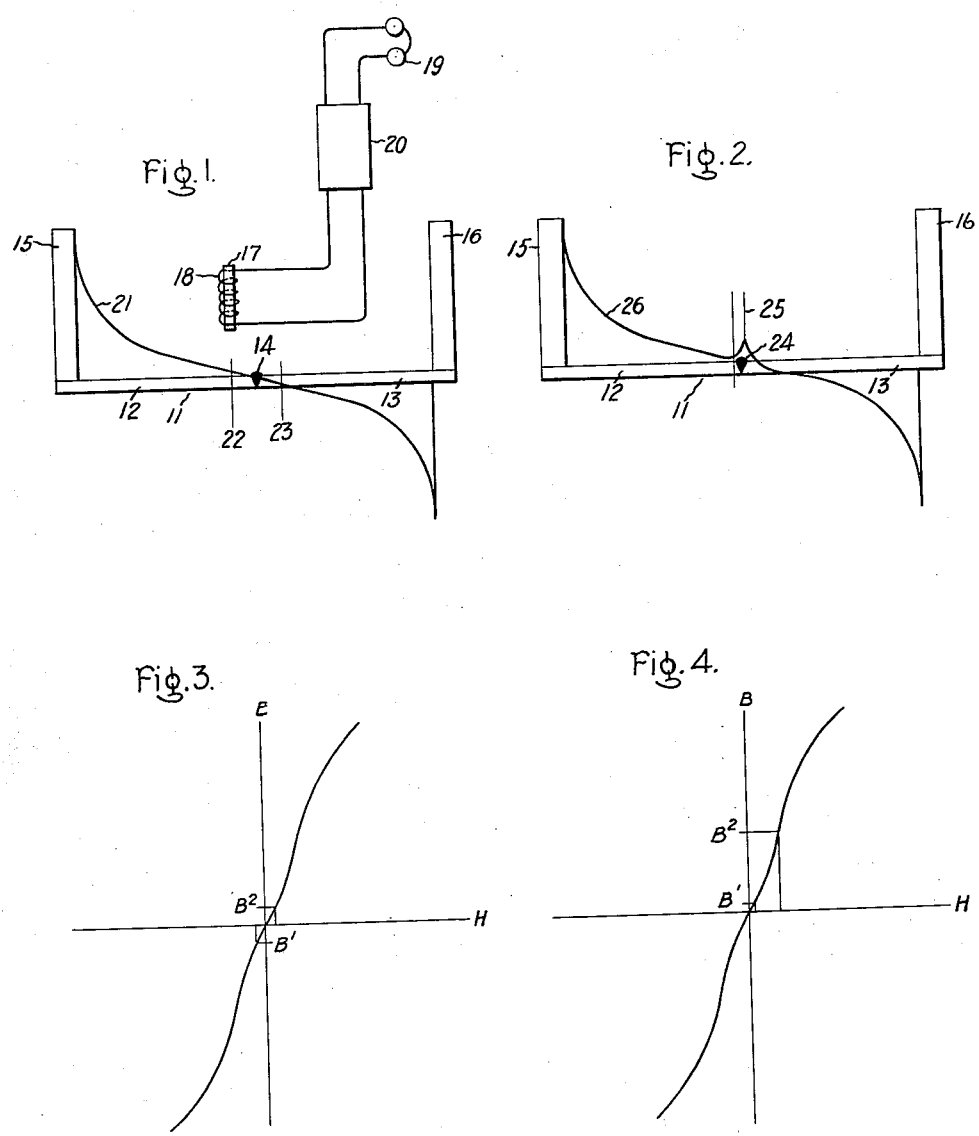
Inventor:
Joachim Pfaffenberger,
by Harry E. Dunham
His Attorney Patented Nov. 2, 1937

2,098,064

UNITED STATES PATENT OFFICE 2,098,064

MAGNETIC TESTING DEVICE

Joachim Pfaffenberger, Berlin-Mariendorf, Germany, assignor to General Electric Company, a corporation of New York Application August 27, 1934, Serial No. 741,702
In Germany September 28, 1933

7 Claims. (Cl. 175—183)

My invention relates to magnetic testing devices and methods and concerns particularly arrangements for locating flaws in tested objects and locating portions thereof lacking in homogeneity.

It is an object of my invention to provide a testing arrangement wherein the tested object is subjected to a magnetizing field but the test is substantially unaffected by variations in the magnetic induction resulting from variations in the strength of the magnetizing field or inevitable variations in reluctance of the magnetic circuit.

It is a further object of my invention to provide an arrangement avoiding false indications resulting solely from the nature of the surface of the tested object which might readily occur, for example, when employing exploring elements with pole pieces to be brought in contact with the tested object having an uneven surface or a surface unevenly coated with scale or other nonmagnetic material.

It is still another object of my invention to provide an arrangement responsive to deep internal flaws as well as to surface flaws.

In carrying out my invention in its preferred form, I magnetize the material to be tested longitudinally in case of a tested object having one dimension relatively small with respect to the others but employ only the transverse component of flux for making the measurement or test. The test is made by observing the Barkhausen effect in the core of an exploring coil passed along the surface of the tested object.

The features of my invention which I believe to be novel and patentable will be pointed out in the claims appended hereto. A better understanding of my invention, itself, however, may be obtained by referring to the following description taken in connection with the accompanying drawing in which Fig. 1 represents schematically the arrangement of elements forming one embodiment of my invention and illustrating a condition where the tested object is without flaws; Fig. 2 illustrates the condition where there is a faulty weld in the tested object; and Figs. 3 and 4 are magnetization curves representing the relationship between field strength and flux density in the core of the exploring element in the cases, respectively, where the tested object is free from flaws and where a flaw is detected by means of my apparatus.

Referring now more in detail to the drawing in which like reference characters are used to designate like parts throughout, I have illustrated in Figs. 1 and 2 an object 11 to be tested which is in the form of two steel plates 12 and 13 joined by a butt weld 14. Although my invention is particularly advantageous for testing welds, it will be understood, of course, that the invention is not limited thereto and is useful for detecting flaws such as breaks, cracks, fissures, slag, and other points lacking in homogeneity in any part of a specimen of magnetic material. The specimen or tested object 11 is magnetized longitudinally or along one of the greater dimensions in the case of sheets, in any suitable manner as by means of magnetizing windings surrounding the object or by means of magnets 15 and 16 brought in contact with two points on the object on either side of the portion to be tested for flaws. For testing welds the direction of magnetization is preferably transverse to the line of the weld. The magnets 15 and 16 may be either electro-magnets or permanent magnets. If electro-magnets are employed, they may be energized by either alternating or direct currents.

The detecting element 17 consists of a core of magnetic material and means for observing the Barkhausen effect therein. An arrangement for observing the Barkhausen effect which I have found satisfactory consists of a winding 18 on a core 17 connected to a pair of headphones or other sound-producing device through an amplifier 20. The detecting element 17 is adapted to be moved along the tested object 11 with the magnetic axis of the detecting element 17 perpendicular to the direction of magnetization of the tested object 11.

By making the detecting element 17 responsive only to the normal component of the field or the stray field around the tested object 11, the effects of variations in the nature of the surface of the tested object, and variations in the reluctance across the contacting surfaces of the magnetizing magnets 15 and 16 and object 11, as well as various other sources of error are eliminated.

Although, if desired, means may be provided for passing the detecting element 17 mechanically along the tested object 11 or for producing the motion of the detecting element 17 automatically, I find that satisfactory results may be obtained by merely passing the detecting element 17 along the tested object 11 manually since no particular type of motion is necessary.

The curve 21 in Fig. 1 represents the strength of the transverse component of the magnetic field acting on the object 11 from one magnet to the other. It will be observed that this field varies from a maximum of one polarity at one end to a maximum of the opposite polarity at the other end and, in the case of a homogeneous uniform tested object, the variation in field strength is uniform and passes through zero at the point midway between the magnets 15 and 16. In the case illustrated, this happens to be the point at which the weld 14 is located as the weld 14 represents a point which is homogeneous and without flaws.

As is well known, when a magnetic material is subjected to a varying magnetizing field, the flux density does not vary continuously but varies uniformly in steps or jumps, producing what is known as the Barkhausen effect, described by Professor Barkhausen in 1919 in the Physik Zeitschr, volume 20, pages 401 to 403, and by Richard M. Bozorth in the Physical Review, volume 34, pages 772 to 784, September 1, 1929, and volume 39, page 353, January 15, 1932. Consequently, if a pair of head-phones 19 is connected to the winding 18 carried by the detecting element 17, a note will be heard in the head-phones as the detecting element 17 is passed along the object as a result of the uneven variations in magnetization of the element 17 inducing voltage pulsations in the winding 18. As long as the transverse component of field strength represented by the curve 21 varies smoothly, the note produced will be of a low intensity and will not vary perceptibly in strength as the detecting element 17 passes from a point 22 on one side of the weld 14 to a point 23 on the other side of the weld 14. However, if there should be a flaw in some portion of the tested object 11 as one caused by imperfect weld 24, (Fig. 2) for example, there will be a peak 25 in the portion of the field strength curve 26 opposite the imperfect weld 24, owing to the fact that the magnetic flux lines are deflected at this point by the high reluctance at the defect. In passing detecting element 17 across the point at which the peak 25 in the magnetization occurred, the detecting element 17 will be subjected to a relatively great change in magnetization, producing a much louder note in the head phones 19 and causing the flaw at 24 to be detected.

Referring to Fig. 3 which represents the variation in flux density plotted along the B-axis with variations in field strength plotted along the H-axis it will be seen that, as the field acting on the element 17 changes by a small constant value corresponding to the movement of detecting element 17 from point 22 to point 23 (Fig. 1) the flux density in the detecting element 17 changes a small amount from $B_1$ to $B_2$. The change in flux density being uneven, the Barkhausen effect, a note is produced but only one of low intensity. However, if there should be a flaw producing a peak in the field strength curve, there will be a consequent pronounced increase in flux density from $B_1$ to $B_2$ as illustrated in Fig. 4, and a pronounced increase in the intensity of the note heard in the head-phones 19 will be produced.

Preferably the iron core of the detecting element 17 is relatively short and compact giving it a relatively great demagnetization factor and making the Barkhausen effect substantially independent within wide limits of the field strength and dependent only upon the amount of change in the field. The Barkhausen effect may, it will be understood, be increased by employing a material having a high hysteresis with a high initial permeability for the magnet core of the detecting element 17.

Since the element 17 need not be moved in a particular manner and since its action depends merely on the change in field strength as it is moved along, it may, if desired, be made very small and covered with a protective insulating shield permitting it to be passed along portions of a tested object difficult of access, such as the interior of pipes and similar objects for the purpose of testing seams and the like.

In testing relatively thin plates where the magnetic skin effect is of less consequence, alternating-current electromagnets may advantageously be employed at 15 and 16 for magnetizing the object 11. Since the frequency of the commercial alternating systems is usually 60 cycles or less, the frequency of the voltage impulses produced by the alternations in polarity of the power source will be considerably less than the fault indications given by Barkhausen effect as the frequency for this purpose is considerably higher. Both the difference in frequency and the sensitivity to higher frequencies of the ordinary amplifier and head-phones as well as the human ear permit readily differentiating the note produced by the Barkhausen effect from the low frequency hum produced by the alternations of the power source.

In accordance with the provisions of the patent statutes I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A method of testing an object of magnetizable material which comprises magnetizing the object, passing a detecting coil with a magnetic core along the object in a direction parallel with the direction of magnetization with the magnetic axis of said core perpendicular to the direction of magnetization of said object, thereby producing voltage pulsations in said coil due to Barkhausen effect in said core, and observing the points at which pulsations of increased strength occur in the voltages induced in said coil.

2. A method of testing an object composed of magnetizable material which comprises magnetizing the object, passing a detecting element including a magnetic substance along the object to be tested, and observing the Barkhausen effect in the detecting element.

3. A method of testing a weld in magnetizable material which comprises magnetizing the material longitudinally but transversely to the weld, passing a magnetic element along the material transversely to the weld, and observing the Barkhausen effect in the magnetic element.

4. A method of testing an object of magnetizable material which comprises magnetizing the object in a given direction, passing a detecting coil with a magnetic core along the object in said direction, thereby producing voltage pulsations in said coil due to Barkhausen effect in said core, and determining the points at which variations occur in the pulsations in the voltages induced in said coil.

5. A device for testing an object composed of magnetizable material which comprises an element composed of a magnetic substance and adapted to be passed along said object, and means for observing the Barkhausen effect in said element.

6. A device for testing an object composed of a magnetizable material which comprises a detecting coil with a magnetic core composed of a substance having a high hysteresis with a low initial permeability adapted to be passed along said material, and means responsive to the voltages induced in said winding.

7. An arrangement for testing an object composed of a magnetizable material which comprises means for magnetizing the object, an element composed of a magnetic substance adapted to be passed along said object, and means for observing the Barkhausen effect in said element.

JOACHIM PFAFFENBERGER.